US010776478B2

(12) United States Patent
Guo et al.

(10) Patent No.: US 10,776,478 B2
(45) Date of Patent: Sep. 15, 2020

(54) CLIENT LOGIN METHOD AND APPARATUS AND STORAGE MEDIUM

(71) Applicant: Tencent Technology (Shenzhen) Company Limited, Shenzhen (CN)

(72) Inventors: Chong Guo, Shenzhen (CN); Shang Yu, Shenzhen (CN); Yi Xu, Shenzhen (CN); Xiaodong Gou, Shenzhen (CN); Guohong Lin, Shenzhen (CN); Qiuhang Tan, Shenzhen (CN); Hongwei Li, Shenzhen (CN); Shengwei Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 102 days.

(21) Appl. No.: 15/955,488

(22) Filed: Apr. 17, 2018

(65) Prior Publication Data

US 2018/0232515 A1 Aug. 16, 2018

Related U.S. Application Data

(63) Continuation of application No. PCT/CN2017/075757, filed on Mar. 6, 2017.

(30) Foreign Application Priority Data

Mar. 11, 2016 (CN) .......................... 2016 1 0140719

(51) Int. Cl.
*G06F 21/00* (2013.01)
*G06F 21/41* (2013.01)
(Continued)

(52) U.S. Cl.
CPC .............. *G06F 21/41* (2013.01); *G06F 21/33* (2013.01); *G06F 21/36* (2013.01); *H04L 63/08* (2013.01)

(58) Field of Classification Search
CPC ............... H04L 63/083; H04L 63/0853; H04L 63/0861; H04L 63/102; H04L 63/18
See application file for complete search history.

(56) References Cited

U.S. PATENT DOCUMENTS 9,787,664 B1* 10/2017 Subbiah .................. G06F 21/41
2011/0289508 A1 11/2011 Fell et al.
2014/0122730 A1* 5/2014 Burch .................. H04L 67/146
709/228

FOREIGN PATENT DOCUMENTS

CN 102065141 A 5/2011
CN 103188237 A 7/2013
(Continued)

OTHER PUBLICATIONS

Office Action dated Jul. 22, 2019 for Chinese Application No. 201610140719.4 with concise English Translation, 11 pages.
(Continued)

*Primary Examiner* — Ghazal B Shehni
(74) *Attorney, Agent, or Firm* — Brinks Gilson & Lione

(57) ABSTRACT

The present disclosure discloses a client login method and apparatus. The method includes obtaining, on a login interface of a first application running on a terminal device, a login account information that is currently used to log into a second application distinct from the first application and running on the terminal device, the second application and the first application having an association relationship; displaying an icon representing the login account information in the login interface of the first application on the terminal device; detecting, on the login interface of the first application, an operation performed on the icon; upon detecting the operation, generating a login request, the login request being used for requesting to log in to the first application by using the login account information associated with the second application; and receiving a confirmation from a server
(Continued)

associated with the first application for accessing and logging into the first application.

14 Claims, 7 Drawing Sheets

(51) Int. Cl.
    *H04L 29/06*     (2006.01)
    *G06F 21/33*     (2013.01)
    *G06F 21/36*     (2013.01)

(56)     References Cited

FOREIGN PATENT DOCUMENTS

| | | |
|---|---|---|
| CN | 103634316 A | 3/2014 |
| CN | 103905497 A | 7/2014 |
| CN | 104753943 A | 7/2015 |
| CN | 104917778 A | 9/2015 |
| CN | 105072133 A | 11/2015 |
| CN | 105288998 A | 2/2016 |
| CN | 105827600 A | 8/2016 |

OTHER PUBLICATIONS

International Preliminary Report on Patentability dated Sep. 11, 2018 for PCT Application No. PCT/CN2017/075757 (English and Chinese languages) (5 pp.).

International Search Report and Written Opinion dated May 31, 2017 for PCT Application No. PCT/CN2017/075757 (English and Chinese languages) (13 pp.).

\* cited by examiner

```
private RSACrypt rsa;
@Override
protected void onCreate(Bundle savedInstanceState){
    PerfTracer.printf(PerfConstant.Start.LoginBegin, "QZoneLoginActivity-Login-Begin" );

super.onCreate(savedInstanceState);
    float scale = getResources().getDisplayMetrics().heightPixels * 1.0f /  DESIGN_SCREEN_HEIGHT;
    size_move_logo *=scale;
    size_move_login_layout *= scale;

SafeModeManagerClient.getInstance().loginFailClear();

if (savedInstanceState != null) {
       bRestoreok =false;
    }
    SpeedReport.g().start(SpeedReport.Point.INIT_LOGIN_UI);
    mLayoutInitHeight = 0;

If (getIntent() != null && getIntent().getBooleanExtra(PARAM_FROM_THIRD_APP,false)) {
       mFromThirdApp = true;
    }
    ShortcutBadger.setBadge(getApplicationContext(), 0);
    //Initialize UI
    initUI();
    ViewUtils.setViewBackground(getWindow().getDecorView(), null);
    initData();
    initBroadCastReceiver();
    setIsSupportHardKeyboard(true);
    processNetworkPermission();

startEnterAnimation();
    validateSignature(getCallingPackage());
}
```

FIG. 8

CLIENT LOGIN METHOD AND APPARATUS AND STORAGE MEDIUM

RELATED APPLICATION

This application claims priority to International Patent Application No. PCT/CN2017/075757, filed with the Chinese Patent Office on Mar. 6, 2017, which claims priority to Chinese Patent Application No. 201610140719.4, entitled "CLIENT LOGIN METHOD AND APPARATUS" filed with the Chinese Patent Office on Mar. 11, 2016, which are incorporated by reference in their entireties.

TECHNOLOGY FIELD

The present disclosure relates to the field of computer user interface, and in particular, to a client login, access, and verification method, apparatus, and a storage medium.

BACKGROUND

At present, existing client login methods usually include the following two types:

1) Login by using an account and a password. As shown in FIG. 1(a) to FIG. 1(d), a user log in by first inputting the login account on a login interface of a client device, then inputting the corresponding password, and waiting for a login verification of the input account and password. Because the login account and password of a user are usually set to be quite long, login operations required for manually inputting a login account and a password are relatively cumbersome, time consuming and inefficient.

2) Login by using a third party authorization. FIG. 2(a) to FIG. 2(d) show implementation of a login process via authorization by a reliable third party. In this way, an authorization operation needs to be added to the login interface, as shown in FIG. 2(b) to FIG. 2(c). The third party further performs a process of login authorization. However, this manner of login affords relatively low security, involves increased number of interactions and login complexity, and affects the login efficiency.

SUMMARY

Embodiments of the present disclosure provide a client login method and apparatus, so as to resolve the technical problem that the existing login methods are relatively of low efficiency.

According to one aspect of an embodiment of the present disclosure, a client login method is provided, including: obtaining, on a login interface of a first client running on a terminal, a login account that is currently used to log into a second client running on the terminal, the second client and the first client having an association relationship; performing, on the login interface of the first client, an operation on the obtained login account, and obtaining a login request generated after performing the operation on the login account, the login request being used for requesting to log in to the first client by using the login account; and logging in to the first client by using the login account in response to the login request.

According to another aspect of an embodiment of the present disclosure, a client login method is further provided, including: receiving a login verification request of a terminal on which a first client runs for a login account, the login account being a login account that is currently used to log into a second client running on the terminal, and the second client and the first client having an association relationship; verifying, in response to the login verification request, whether the first client uses the login account to perform a login; and sending a response indicating a successful login verification by using the second client when verification is successful, so that the first client uses the login account to perform the login.

According to still another aspect of an embodiment of the present disclosure, a client login apparatus is provided, including: a first obtaining unit, configured to obtain, on a login interface of a first client running on a terminal, a login account that is currently used to log into a second client running on the terminal, the second client and the first client having an association relationship; a second obtaining unit, configured to obtain, on the login interface of the first client, a login request generated after performing an operation on the login account, the operation performed on the login account being performed on the login interface of the first client, and the login request being used for requesting to log in to the first client by using the login account; and a login unit, configured to log in to the first client by using the login account in response to the login request.

According to yet another aspect of an embodiment of the present disclosure, a client login apparatus is further provided, including: a first receiving unit, configured to receive a login verification request of a terminal on which a first client runs for a login account, the login account being a login account that is currently used to log into a second client running on the terminal, and the second client and the first client having an association relationship; a verification unit, configured to verify, in response to the login verification request, whether the first client uses the login account to perform a login; and a sending unit, configured to send a response indicating a successful login verification by using the second client when verification is successful, so that the first client uses the login account to perform the login.

According to still yet another aspect of an embodiment of the present disclosure, a non-volatile storage medium is further provided, storing a computer readable instruction. When the instruction is executed, a computer is caused to execute the foregoing client login methods.

In the embodiments of the present disclosure, on a login interface of a first client running on a terminal, a login account that is currently used to log into a second client running on the terminal is obtained, the second client and the first client having an association relationship; on the login interface of the first client, a login request generated after performing an operation on the login account is obtained, the login request being used for requesting to log in to the first client by using the login account; and the first client is logged in to by using the login account in response to the login request. That is, the first client obtains the login account that is currently used to log into the second client from the second client having the association relationship, and uses the obtained login account to implement a quick login, thereby simplifying login operations for logging in to the client, reducing the number of unnecessary interactions, reducing the login time required for logging in to the client login, and improving the login efficiency, to overcome the problem of low login efficiency caused by complex operations such as multiple interactions required in the existing technology.

BRIEF DESCRIPTION OF THE DRAWINGS

The accompanying drawings are intended to provide further illustration of the present disclosure.

FIG. 8 is a schematic diagram of another exemplary client login method according to an embodiment of the present disclosure;

DETAILED DESCRIPTION

The following detailed description and illustration provide a person of ordinary skill in the art an understanding of the solutions in the present disclosure. The embodiments described herein are merely examples. Other embodiments that may be obtained by a person of ordinary skill in the art based on the exemplary embodiments of the present disclosure without creative efforts shall fall within the protection scope of the present disclosure.

It should be noted that in the specification, claims, and the accompanying drawings of the present disclosure, the terms "first", "second", and so on are intended to distinguish between similar objects rather than describe a specific order or a chronological order. It should be understood that, entities identified by these terms may be interchanged in suitable situations, so that the described embodiments of the present disclosure can be implemented in a sequence besides the sequence described herein or shown in the figure. In addition, terms such as "including", "having", and any variation thereof, are intended to cover non-exclusive inclusion. For example, a process, method, system, or product that include a series of steps, units, or modules, may involve other steps, units, or modules besides the listed steps, units, or modules.

Embodiment 1

Figure 1:
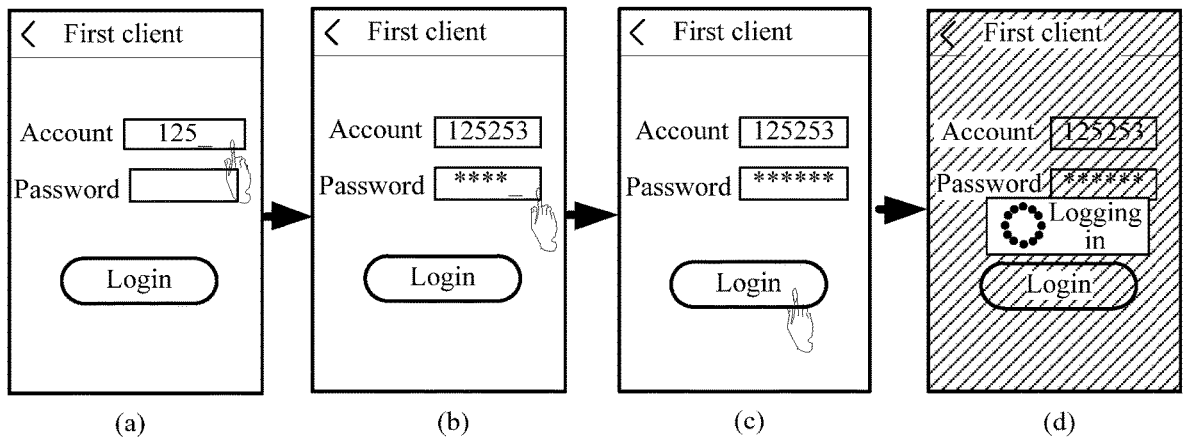
FIG. 1 is a schematic diagram of a client login method according to an existing technology.
Figure 2:
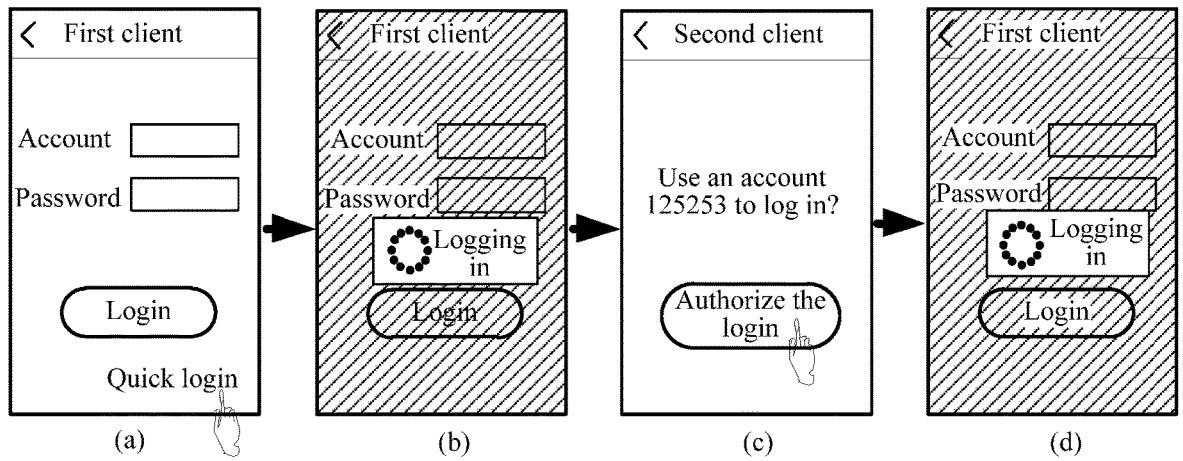
FIG. 2 is a schematic diagram of another client login method according to another existing technology.
Figure 3:
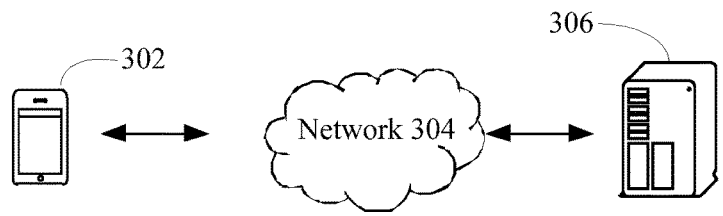
FIG. 3 is a schematic diagram of an application environment of an exemplary client login method according to an embodiment of the present disclosure.

According to an embodiment of the present disclosure, an embodiment of a client login method is provided. The login method may be applied in, but is not limited to, an application environment as shown in FIG. 3. In particular, on a login interface of a first client (e.g., a client application or an instance of an application running on a terminal device) running on a terminal device 302 (a terminal device is herein alternatively referred to as a terminal), a login account that is currently used to log into a second client running on the terminal 302 is obtained, the second client and the first client having an association relationship. An operation is further performed on the obtained login account in the login interface of the first client, and a login request is then generated by the login interface of the first client after detecting the operation on the obtained login account by the terminal. The login request is used by the login interface of the first client for requesting to log into the first client by using the login account. The user may thus log into the first client by using the obtained login account information of the second client. In particular, the login request is sent to a server 306 corresponding to the first client. After the terminal 302 displays a first client login interface, resource information is returned from the server 306 corresponding to the first client by using a communication network 304 (alternatively referred to as network). The server corresponding to the first client may be a server that provides service for the first client. As such, the login account that is currently used to log into the second client associated with the first client is obtained, and is directly used for log into the first client. Login operations for logging in to the first client are therefore simplified, less time-consuming, and more efficient.

The terminal device above may include, but is not limited to, at least one of the following: a mobile phone, a tablet computer, a notebook computer and a desktop computer. As an example, in this embodiment, the foregoing network may include, but is not limited to, at least one of the following: a wide area network, a metropolitan area network and a local area network.

Figure 4:
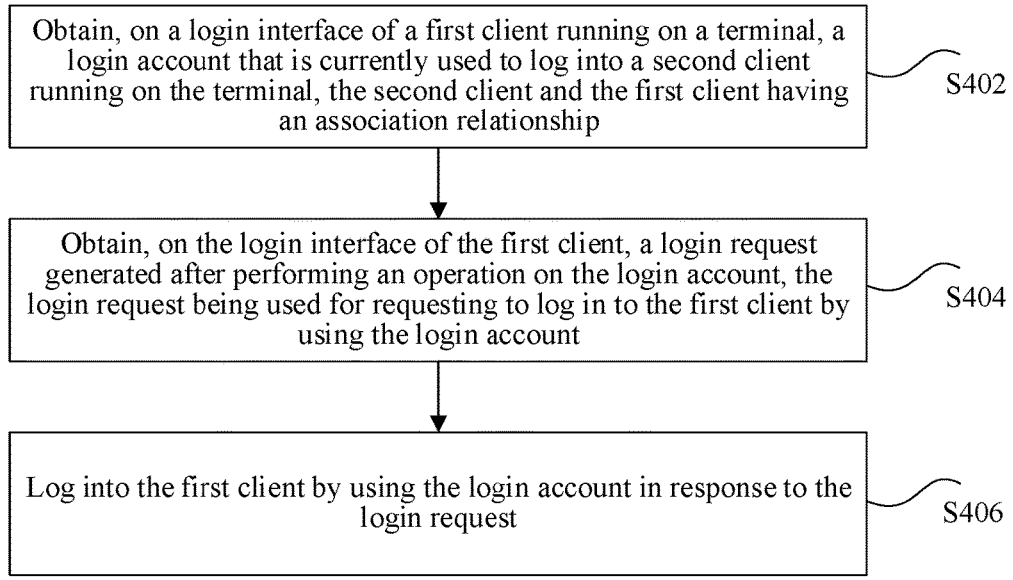
FIG. 4 is a flow chart of an exemplary client login method according to an embodiment of the present disclosure.

According to an embodiment of the present disclosure, a client login method is provided. As shown in FIG. 4, the method includes:

S402: obtaining, on a login interface of a first client running on a terminal, a login account that is currently used to log into a second client running on the terminal, the second client and the first client having an association relationship;

S404: performing, on the login interface of the first client, an operation on the obtained login account, and obtaining a login request generated after performing the operation on the login account, the login request being used for requesting to log in to the first client by using the login account; and S406: logging in to the first client by using the login account in response to the login request.

Figure 5:
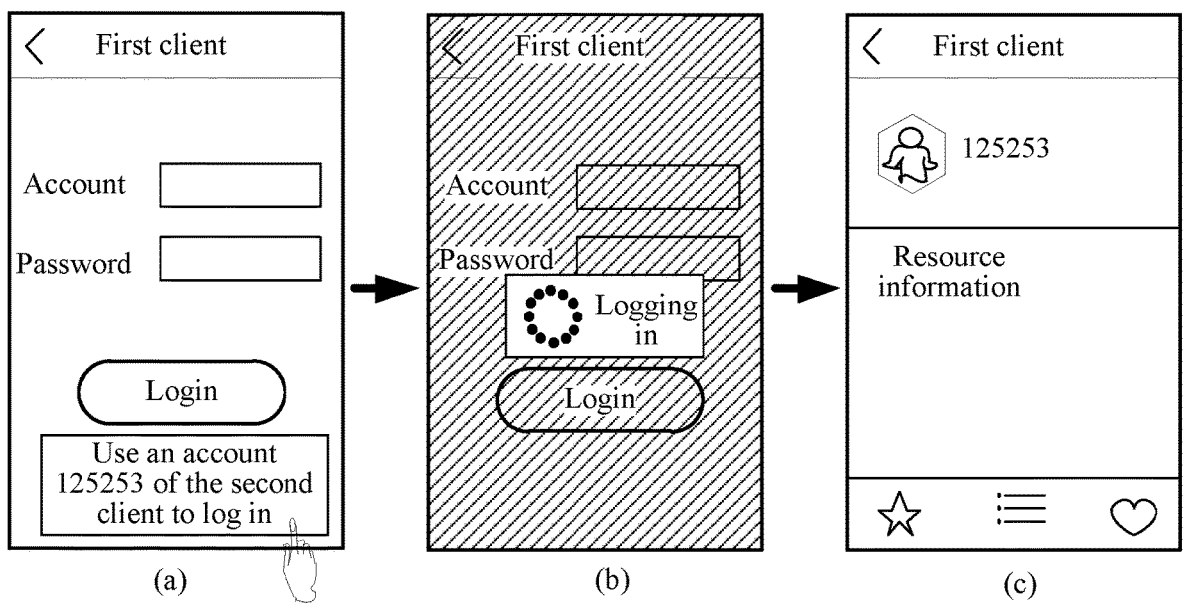
FIG. 5 is a schematic diagram of an exemplary client login method according to an embodiment of the present disclosure.

As an example, the foregoing client login method may be applied in, but is not limited to, a login process of clients (for example, an instant messaging application client, and a community space sharing application client corresponding to the instant messaging application client) having an association relationship. That is, the login account (for example, an account 125253 shown in FIG. 5) that is currently used to log into the second client running on the terminal is obtained by using the association relationship between the first client and the second client during the process for logging into the first client, and further the login account is used to implement a quick login to the first client, as shown in FIG. 5(a) to FIG. 5(c), so that resource information returned from a server corresponding to the first client is displayed after logging into the first client. The foregoing method embodiment is merely an example, and no limitation is set in this embodiment.

It should be noted that in this embodiment, a login account that is currently used to log into a second client running on the terminal is obtained by a login interface of a first client running on a terminal and having an association relationship with the second client; a login request is then generated by the login interface of the first client after performing an operation on the obtained login account, the login request being used for requesting to log in to the first client by using the login account; and the first client is logged in to by using the login account in response to the login request. The first client obtains the login account that is currently used to log into the second client from the second client having the association relationship, and uses the obtained login account to implement a quick login, thereby simplifying login operations for logging in to the first client, reducing the number of unnecessary interactions, decreasing the login time required for logging in to the first client, and improving the login efficiency, compared to existing technologies.

In one implementation, obtaining, on the login interface of the first client, a login request generated after performing an operation on the login account includes: detecting and obtaining by the first client a selection instruction generated after a user performs a selection operation of the login account, and sends a login verification request to the second client in response to the selection instruction; and verifying by a server corresponding to the second client whether the first client is permitted to use the foregoing login account to perform a login, and when verification is successful, sending by the second client a response indicating a successful login verification, so that the first client may use the foregoing login account to perform the quick login. The server corresponding to the second client above may be a server that provides service for the second client.

Figure 6:
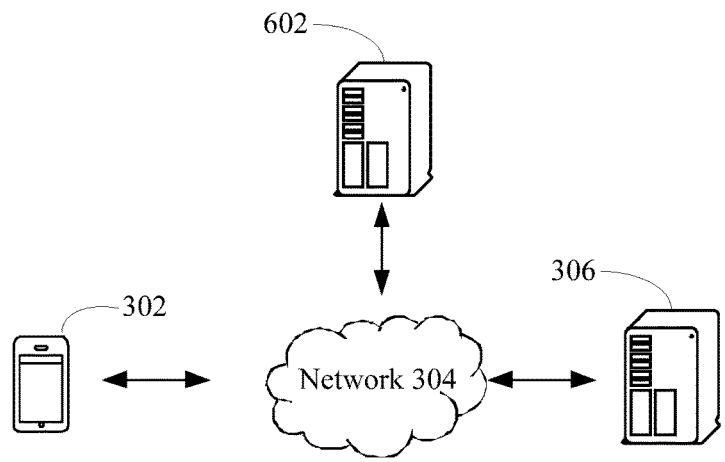
FIG. 6 is a schematic diagram of an application environment of another exemplary client login method according to an embodiment of the present disclosure.

That is, as shown in FIG. 6, after obtaining, during login process of a first client running on a terminal 302, a login account that is currently used to log into a second client running on the terminal 302 and having an association relationship with the first client, the first client generates a selection instruction in response to a selection operation on the login account, and the terminal 302 sends a login verification request to a server 602 corresponding to the second client in response to the selection instruction, so that the server 602 uses information registered in advance to verify whether the first client on the terminal 302 may use the foregoing login account to perform the quick login. After obtaining, by using the second client, a response indicating a successful login verification sent by the server 602, the first client obtains and generates a login request used for requesting to log in to the first client by using the login account, and sends the login request to the server 306 corresponding to the first client, to obtain resource information of the first client to be displayed after login.

In one implementation, during the foregoing verification of FIG. 6, the server corresponding to the second client 602 may, but is not limited to, perform verification on a login signature. For example, before obtaining the login account that is currently used to log into the second client running on the terminal, the first client sends a registration request to the server corresponding to the second client, the registration request being used for requesting to register a login signature (for example, Sign A) of the first client on the server 602. When performing the login after obtaining the foregoing login account, the first client sends the login verification request carrying a login signature (for example, Sign B) corresponding to the first client to the server 602, the server 602 performs verification (e.g., comparison) on the login signature Sign A that is registered in advance and the Sign B that is obtained from the first client requesting verification, so that it can be quickly verified whether the first client can use the account that is currently used to log into the second client to perform a quick login to the first client, thereby reducing the login time of the first client and improving the login efficiency.

In one implementation, obtaining by the login interface of a first client the login account that is currently used to log into the second client may comprise: performing communication between the first client and the second client in the terminal, so that the first client directly obtains the login account that is currently used to log into the second client, and displaying the login account on the login interface of the first client. As shown in FIG. 5(a), the login account that is currently used to log into the second client is displayed on the login interface of the first client.

In one implementation, sending the login verification request to the second client may include: creating a transparent interface of the second client on the login interface of the first client, and sending, on the transparent interface, the login verification request to the second client. In this way, the login verification request can carry the first login signature corresponding to the first client, which is used for login verification.

Figure 7:
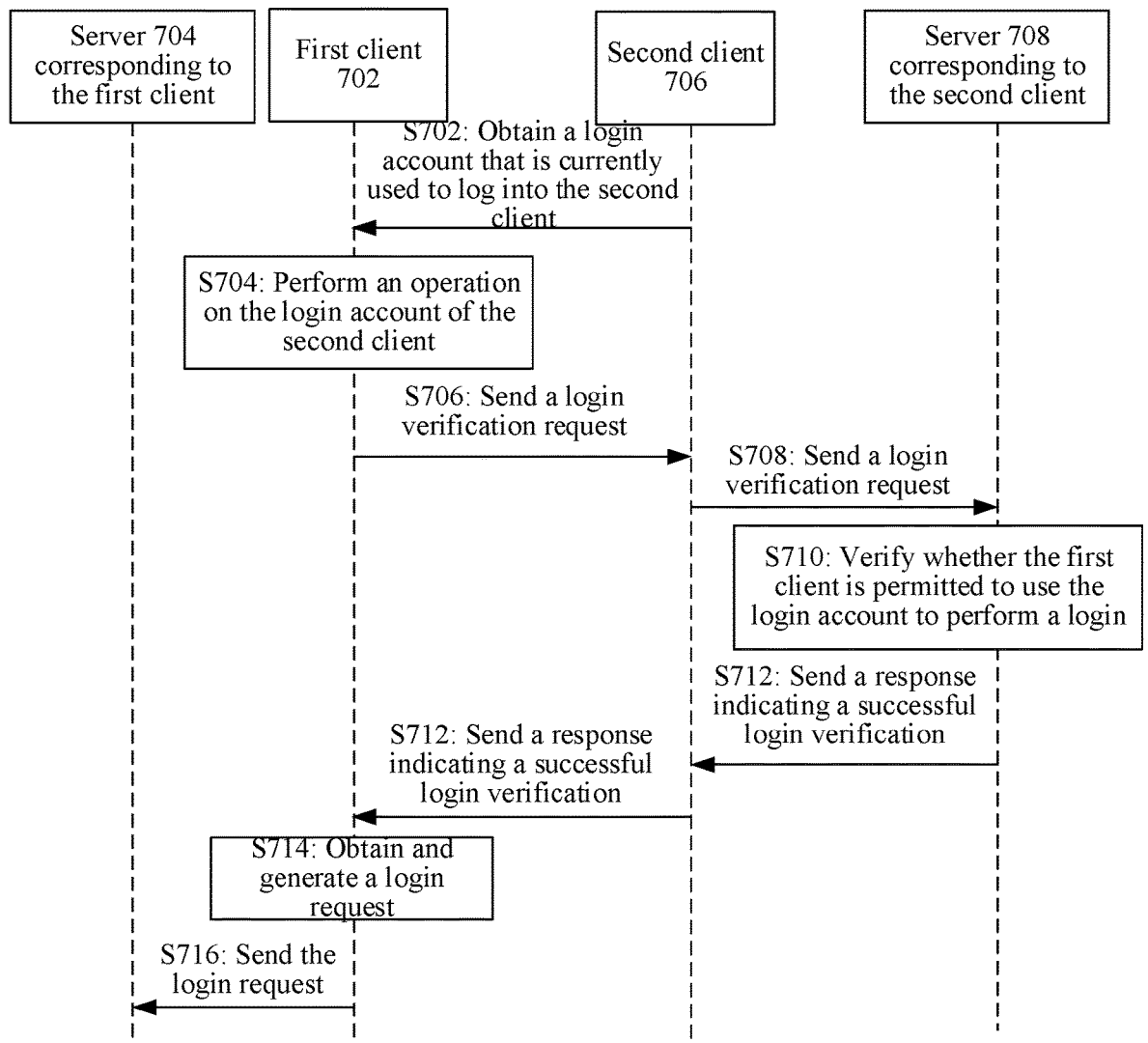
FIG. 7 is a flow chart of another exemplary client login method according to an embodiment of the present disclosure.

Details are described with reference to the following examples. As shown by steps S702 to S716 of FIG. 7: A first client 702 obtains a login account that is currently used to log into the second client 706 from the second client 706, performs an operation (for example, a selected operation) on the login account, responds to an operation instruction generated by the operation and sends a login verification request to a server 708 associated with the second client via the second client 706, and verifies in the server 708 corresponding to the second client whether the first client is permitted to use the login account to perform the login. When verification is successful, the server associated with the second client sends a response (for example, the response carries a login ticket) of a successful login verification to the first client via the second client, the first client 702 obtains and generates a login request used for login according to the response, sends the login request to a server 704 associated with the first client, and after displaying a login of the first client 702, obtains returned resource information from the server 704 corresponding to the first client.

According to the implementations above, on a login interface of a first client running on a terminal, a login account that is currently used to log into a second client running on the terminal is obtained, the second client and the first client having an association relationship; on the login interface of the first client, a login request generated after performing an operation on the login account is obtained, the login request being used for requesting to log in to the first client by using the login account; and the first client is logged in to by using the login account in response to the login request. The first client obtains the login account that is currently used to log into the second client from the second client having the association relationship, and uses the obtained login account to implement a quick login, thereby simplifying login operations for logging in to the client, reducing the number of unnecessary interactions, reducing the login time required for logging into the first client, and improving the login efficiency over the existing technology.

In one implementation, performing, on the login interface of the first client, the operation on the obtained login account, and obtaining the login request generated by performing the operation on the login account of the second client includes:

S1: receiving a selection instruction, the selection instruction being used for selecting the login account displayed on the login interface of the first client;

S2: sending a login verification request to the second client in response to the selection instruction, the login verification request at least carrying a first login signature corresponding to the first client;

S3: obtaining a response indicating a successful login verification sent by the second client, the response carrying a login ticket used for logging into the first client; and S4: obtaining the login request generated by using the login ticket.

In one implementation, the foregoing first login signature may be, but is not limited to, a signature used for uniquely identifying the first client. By sending the first login signature of the first client that currently requests login, the first login signature and a second login signature that is registered in advance can be compared for verification, thereby ensuring an efficient and quick verification on the quick login process of the first client.

Details are described with reference to the following examples. A selection instruction on a login account (as shown in FIG. 5(a)) that is displayed on a login interface of a first client and that is currently used to log into a second client is received, and a login verification request is sent in response to the selection instruction, and a waiting interface of "logging in" is displayed on a terminal. After obtaining a response indicating a successful login verification sent by the second client, a login request generated by using a login ticket used for logging in to the first client is obtained, and the login request is sent to a server associated with the first client.

In one implementation, a login verification process of the first client may be implemented by using code or pseudo code shown in FIG. 8.

According to the embodiments provided in this application, verification is performed on the obtained login account that is currently used to log into the second client, thereby ensuring security of the first client using the login account to perform the login.

In one further implementation, before the obtaining the login account that is currently used to log into the second client running on the terminal, the method further includes:

S1: sending a registration request to a server corresponding to the second client, the registration request being used for requesting to register a second login signature of the first client on the server; and S2: establishing the association relationship between the first client and the second client.

For example, the foregoing association relationship between the first client and the second client may be a predetermined association relationship, for example, an instant messaging application client, and a community space sharing application client corresponding to the instant messaging application client.

For another example, the association relationship between the first client and the second client may alternatively be established in a manner of registering a login signature. That is, before login of the first client, a login signature of the first client is registered in advance in the server associated with the second client, for establishment of the association relationship between the first client and the second client.

According to the embodiment provided in this application, by pre-registering a login signature of the first client on the server associated with the second client, another login signature obtained from the first client requesting the login can be used for verification, thereby implementing a quick verification whether the first client may use the foregoing login account to achieve a quick login.

In another implementation, after the sending the login verification request to the second client in response to the selection instruction, and before the obtaining the response indicating a successful login verification sent by the second client, the method further includes:

S1: the server receiving the first login signature by using the second client;

S2: the server verifying whether the received first login signature is consistent with the registered second login signature; and S3: the server, when verifying that the first login signature is consistent with the registered second login signature, sending the response indicating a successful login verification by using the second client.

Details are described with reference to the following examples. Before a first client (APP-1) obtains a login account (ID) that is currently used to log into a second client (APP-2) running on a terminal, sending a registration request to a server (S2) associated with the second client (APP-2) and registering a login signature (for example, Sign A) of the first client (APP-1).

When performing the login after obtaining the foregoing login account (ID), the first client (APP-1) sends the login verification request carrying a login signature (for example, Sign B) corresponding to the first client to the server (S2) associated with the second client (APP-2), the server (S2) corresponding to the second client (APP-2) performs verification on the login signature (for example, Sign A) that is registered in advance and the login signature (for example, Sign B) that is obtained from the first client requesting verification, for example, verifying whether the received first login signature (for example, Sign A) is consistent with the registered second login signature (for example, Sign B). When verifying that the first login signature (for example, Sign A) is consistent with the registered second login signature (for example, Sign B), the server sends the response indicating a successful login verification by using the second client.

According to the embodiment provided in this application, by verifying the login signature, implementing a quick verification on whether the first client may use the account that is currently used to log into the second client to perform the quick login, thereby reducing the login time of the first client and improving the login efficiency.

In another implementation, sending the login verification request to the second client in response to the selection instruction includes:

S1: creating a transparent interface of the second client on the login interface of the first client in response to the selection instruction; and S2: sending the login verification request to the second client on the transparent interface of the second client.

Details are described with reference to the following examples. After receiving the selection instruction to "using the account 125253 of the second client to log in" as shown in FIG. 5, the first client creates the transparent interface of the second client on the login interface of the first client, for example, invoking the transparent interface of the second client by using android startActivity( ) After receiving a request of the startActivity( ) the second client obtains the first login signature of the first client by using Activity.getCallingActivity( ) of android, and sends the login verification request carrying the first login signature to the server associated with the second client.

According to the embodiments provided in this application, a transparent interface of the second client is created on the login interface of the first client, to reduce the number of interactions with a user during a login, so that the user will not perceive the interface that uses the second client to send login verification, thereby improving user experience.

In another implementation, obtaining, on a login interface of a first client running on a terminal, a login account that is currently used to log into a second client running on the terminal includes:

S1: receiving a running request for running the first client;

S2: displaying the login interface of the first client on the terminal in response to the running request; and S3: performing communication between the first client and the second client, to obtain the login account that is currently used to log into the second client, and displaying the login account on the login interface of the first client.

Details are described with reference to the following examples. The running request for running the first client is received; after determining that the terminal has been installed with the first client and the second client having the association relationship with the first client, the login interface of the first client is opened and displayed, and the login account that is currently used to log into the second client is obtained from the second client by using an android binder communication mechanism. After the first client obtains the foregoing login account during communication, it displays the foregoing login account on the login interface of the first client, for example, as shown in FIG. 5(a), as a selectable key (button, or icon) labeled with "use the account 125253 of the second client to log in".

According to the embodiment provided in this application, communication between the first client and the second client is performed to obtain the login account that is currently used to log into the second client, so that the first client can use the login account to implement a quick login, thereby reducing the login time required for logging in to the client and improving the login efficiency over the existing technology.

It should be noted that, for the brevity of description, the aforementioned embodiments are described as a sequence of steps. But a person of ordinary skill in the art should understand that the present disclosure is not limited to any described sequence of steps, as some steps can include other sequences or can be performed in parallel or in different order according to the present disclosure. In addition, a person of ordinary skill in the art should also know that all the embodiments and implementations described in this specification are merely examples, and the related steps and components are not necessarily required.

Through the foregoing description of the implementation manners, it should be clear to a person of ordinary skill in the art that the present disclosure may be implemented by software plus a necessary general or special hardware platform according to methods of the foregoing embodiments, and certainly may also be implemented solely by hardware. In many cases, software implementations may be preferred. Based on such an understanding, the technical solutions of the present disclosure or the part that makes contributions to the existing technology may be embodied in the form of a software product. The computer software product may be stored in a non-transitory storage medium (for example, a ROM/RAM, a magnetic disk, or an optical disc), and contains instructions for instructing a terminal device (which may be a mobile phone, a computer, a server, or a network device) to perform the methods according to the embodiments of the present disclosure.

Embodiment 2

Figure 9:
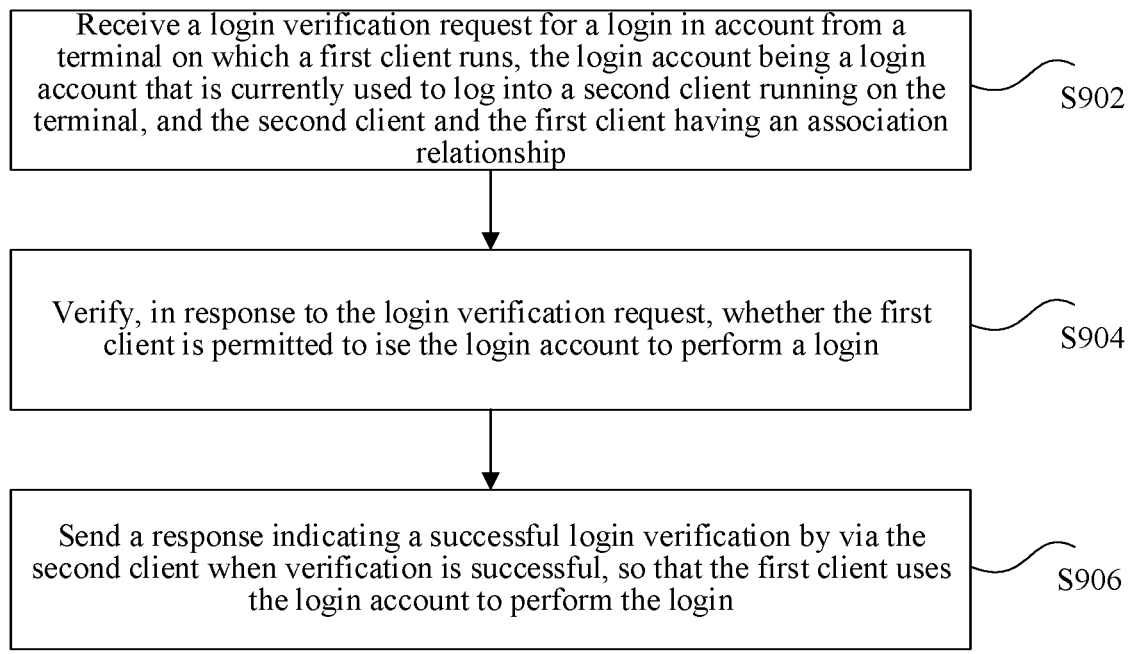
FIG. 9 is a flow chart of yet another exemplary client login method according to an embodiment of the present disclosure.

According to an embodiment of the present disclosure, a client login method is provided. As shown in FIG. 9, the method includes:

S902: receiving a login verification request for a login account from a terminal on which a first client runs, the login account being a login account that is currently used to log into a second client running on the terminal, and the second client and the first client having an association relationship;

S904: verifying, in response to the login verification request, whether the first client is permitted to use the login account to perform a login; and S906: sending a response indicating a successful login verification via the second client when verification is successful, so that the first client uses the login account to perform the login.

In one implementation, the foregoing client login method may be applied in, but is not limited to, a login process of clients (for example, an instant messaging application client, and a community space sharing application client corresponding to the instant messaging application client) having an association relationship. That is, during a login process of the first client using the login account, the second client having the association relationship with the first client performs quick verification on the login verification request of the login account, verifying whether the first client is permitted to use the login account to perform the login, thereby enabling quick login for the first client, simplifying login operations for logging in to the first client, reducing the number of unnecessary interactions, reducing the login time required for logging in to the first client, and improving the login efficiency.

In one implementation, after obtaining an instruction selecting the login account, the first client may, but is not limited to, send the foregoing login verification request to the second client.

That is, as shown in FIG. 6, after obtaining, during login, the login account that is currently used to log into the second client having the association relationship with the first client, the first client running on a terminal 302 generates the selection instruction after the login account is selected, and the terminal 302 sends the login verification request to a server 602 associated with the second client in response to the selection instruction, so that the server 602 uses information registered in advance to verify whether the first client on the terminal 302 may use the foregoing login account to perform the quick login. After obtaining, by using the second client, the response indicating a successful login verification sent by the server 602, the first client obtains and generates the login request used for requesting to log in to the first client by using the login account, and sends the login request to the server 306 corresponding to the first client, to obtain the resource information to be displayed after login.

In one implementation, during the foregoing verification, the server corresponding to the second client may perform verification on a login signature. For example, before obtaining the login account that is currently used to log into the second client running on the terminal, the first client sends a registration request to the server corresponding to the second client, the registration request being used for requesting to register a login signature (for example, Sign A) of the first client on the server. When performing the login after obtaining the foregoing login account, the first client sends the login verification request carrying a login signature (for example, Sign B) corresponding to the first client to the server associated with the second client, the server corresponding to the second client performs verification on a login signature Sign A that is registered in advance and the Sign B that is obtained from the first client requesting verification, so that it can be quickly verified whether the first client can use the account that is currently used to log into the second client to perform a quick login, thereby reducing the login time of the first client and improving the login efficiency.

Details are described with reference to the following examples. As shown by steps S702 to S716 of FIG. 7: A first client 702 obtains a login account that is currently used to log into the second client 706 from a second client 706, performs an operation (for example, a selected operation) on the login account, responds to an operation instruction generated by the operation and sends a login verification request to a server 708 associated with the second client via the second client 706, and verifies in the server 708 associated with the second client whether the first client is permitted to use the login account to perform the login. When verification is successful, the server 708 associated with the second client sends a response (for example, the response carries a login ticket) of a successful login verification to the first client via the second client, the first client 702 obtains and generates a login request used for login according to the response, sends the login request to a server 704 associated with the first client, and after displaying a login of the first client 702, obtains returned resource information from the server 704 corresponding to the first client.

According to the embodiment provided in this application, verification is performed on the obtained login account that is currently used to log into the second client, thereby ensuring a quick verification on the first client using the login account to login, simplifying login operations for logging in to the client, reducing the number of unnecessary interactions, reducing the login time required for logging in to the client, and improving the login efficiency. Further, security of the first client using the foregoing login account to perform the login can be ensured.

In one implementation, the login verification request at least carries a first login signature corresponding to the first client, and before receiving a login verification request for a login in account from a terminal on which a first client runs, the method further includes:

S1: receiving a registration request sent by the second client, the registration request being used for requesting to register a second login signature of the first client; and S2: establishing the association relationship between the first client and the second client.

For example, the foregoing association relationship between the first client and the second client may be a predetermined association relationship, for example, an instant messaging application client, and a community space sharing application client corresponding to the instant messaging application client.

For another example, the association relationship between the first client and the second client may alternatively be established in a manner of registering a login signature. That is, before login of the first client, a login signature of the first client is registered in advance in the server associated with the second client, for establishment of the association relationship between the first client and the second client.

According to the embodiment provided in this application, by pre-registering a login signature of the first client on the server associated with the second client, another login signature obtained from the first client requesting the login can be used for verification, thereby implementing a quick verification whether the first client may use the foregoing login account to achieve a quick login.

In one implementation:

S1: verifying, in response to the login verification request, whether the first client uses the login account to perform a login may include: verifying whether the first login signature is consistent with the registered second login signature; and S2: sending a response indicating a successful login verification via the second client when verification is successful includes: sending the response indicating a successful login verification via the second client when the first login signature is consistent with the registered second login signature, the response carrying a login ticket that makes the first client perform the login.

Details are described with reference to the following examples. Before a first client (APP-1) obtains a login account (ID) that is currently used to log into a second client (APP-2) running on a terminal, a registration request is sent to a server (S2) associated with the second client (APP-2) to register a login signature (for example, Sign A) of the first client (APP-1).

When performing a login after obtaining the foregoing login account (ID), the first client (APP-1) sends the login verification request carrying a login signature (for example, Sign B) corresponding to the first client to the server (S2) associated with the second client (APP-2), the server (S2) where the second client (APP-2) is located performs verification on the login signature (for example, Sign A) that is registered in advance and the login signature (for example, Sign B) that is obtained from the first client requesting verification, for example, verifying whether the obtained first login signature (for example, Sign A) is consistent with the registered second login signature (for example, Sign B). When verifying that the first login signature (for example, Sign A) is consistent with the registered second login signature (for example, Sign B), the server sends the response indicating a successful login verification by using the second client.

According to the embodiment provided in this application, by verifying the login signature, implementing a quick verification on whether the first client may use the account that is currently used to log into the second client to perform the quick login, thereby reducing the login time of the first client and improving the login efficiency.

It should be noted that, for the brevity of description, the aforementioned embodiments are described as a sequence of steps. But a person of ordinary skill in the art should understand that the present disclosure is not limited to any described sequence of steps, as some steps can include other sequences or can be performed in parallel or in different order according to the present disclosure. In addition, a person of ordinary skill in the art should also know that all the embodiments and implementations described in this specification are merely examples, and the related steps and components are not necessarily required. Through the foregoing description of the implementation manners, it should be clear to a person of ordinary skill in the art that the present disclosure may be implemented by software plus a necessary general or special hardware platform according to methods of the foregoing embodiments, and certainly may also be implemented solely by hardware. In many cases, the software implementation may be preferred. Based on such an understanding, the technical solutions of the present disclosure or the part that makes contributions to the existing technology may be embodied in the form of a software product. The computer software product may be stored in a non-transitory storage medium (for example, a ROM/RAM, a magnetic disk, or an optical disc), and contains instructions for instructing a terminal device (which may be a mobile phone, a computer, a server, or a network device) to perform the methods according to the embodiments of the present disclosure.

Embodiment 3

Figure 10:
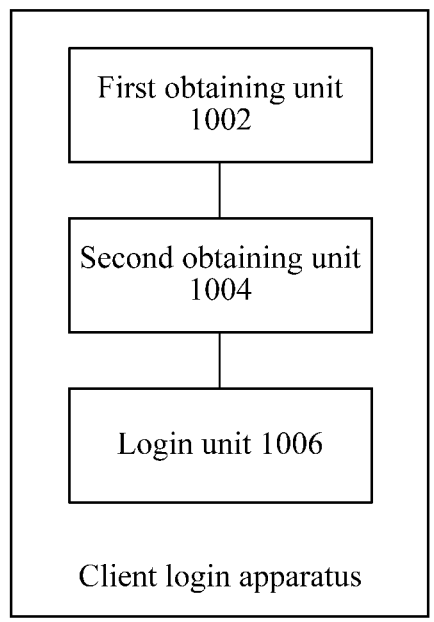
FIG. 10 is a schematic diagram of an exemplary client login apparatus according to an embodiment of the present disclosure.

According to an embodiment of the present disclosure, a client login apparatus configured to implement the foregoing client login methods is further be provided. As shown in FIG. 10, the apparatus includes:

1) a first obtaining unit 1002, configured to obtain, on a login interface of a first client running on a terminal, a login account that is currently used to log into a second client running on the terminal, the second client and the first client having an association relationship;

2) a second obtaining unit 1004, configured to obtain, on the login interface of the first client, a login request generated after detecting an operation performed on the login account, the operation performed on the login account being performed on the login interface of the first client, and the login request being used for requesting to log in to the first client by using the login account; and 3) a login unit 1006, configured to log into the first client by using the login account in response to the login request.

In one implementation, the foregoing client login apparatus may be applied in, but is not limited to, a login process of clients (for example, an instant messaging application client, and a community space sharing application client corresponding to the instant messaging application client) having an association relationship. That is, the login account (for example, an account 125253 shown in FIG. 5) that is currently used to log into the second client running on the terminal is obtained by using the association relationship between the first client and the second client during the process for logging into the first client, and further the login account is used to implement a quick login to the first client, as shown in FIG. 5(a) to FIG. 5(c), so that resource information returned from a server corresponding to the first client is displayed after logging into the first client. The foregoing implementation is merely an example, and no limitation is set in this embodiment.

It should be noted that in this embodiment, a login account that is currently used to log into a second client running on the terminal is obtained by a login interface of a first client running on a terminal and having an association relationship with the second client; a login request is then generated by the login interface of the first client after performing an operation on the login account is obtained, the login request being used for requesting to log in to the first client by using the login account; and the first client is logged in to by using the login account in response to the login request. The first client obtains the login account that is currently used to log into the second client from the second client having the association relationship, and uses the obtained login account to implement a quick login, thereby simplifying login operations for logging in to the first client, reducing the number of unnecessary interactions, reducing the login time required for logging in to the client login, and improving the login efficiency over the existing technology.

In one implementation, the obtaining, on the login interface of the first client, a login request generated after performing an operation on the login account includes: detecting and obtaining by the first client a selection instruction generated after a user performs a selection operation of the login account, and sends a login verification request to the second client in response to the selection instruction; and verified by a server corresponding to the second client whether the first client is permitted to use the foregoing login account to perform a login, and when verification is successful, sending by the second client a response indicating a successful login verification, so that the first client may use the foregoing login account to perform the quick login.

That is, as shown in FIG. 6, after obtaining, during login process of a first client running on a terminal 302, a login account that is currently used to log into a second client running on the terminal 302 and having an association relationship with the first client, the first client generates a selection instruction in response to a selection operation on the login account, and the terminal 302 sends a login verification request to a server 602 corresponding to the second client in response to the selection instruction, so that the server 602 uses information registered in advance to verify whether the first client on the terminal 302 may use the foregoing login account to perform the quick login. After obtaining, by using the second client, a response indicating a successful login verification sent by the server 602, the first client obtains and generates a login request used for requesting to log in to the first client by using the login account, and sends the login request to the server 306 corresponding to the first client, to obtain resource information of the first client to be displayed after login.

In one implementation, during the foregoing verification of FIG. 6, the server corresponding to the second client 602 may, but is not limited to, perform verification on a login signature. For example, before obtaining the login account that is currently used to log into the second client running on the terminal, the first client sends the registration request to the server corresponding to the second client, the registration request being used for requesting to register a login signature (for example, Sign A) of the first client on the server 602. When performing the login after obtaining the foregoing login account, the first client sends the login verification request carrying a login signature (for example, Sign B) corresponding to the first client to the server 602, the server 602 performs verification (e.g., comparison) on the login signature Sign A that is registered in advance and the Sign B that is obtained from the first client requesting verification, so that it can be quickly verified whether the first client can use the account that is currently used to log into the second client to perform a quick login to the first client, thereby reducing the login time of the first client and improving the login efficiency.

In one implementation, the obtaining by the login interface of a first client the login account that is currently used to log into a second client may comprise performing communication between the first client and the second client in the terminal, so that the first client directly obtains the login account that is currently used to log into the second client, and displaying the login account on the login interface of the first client. As shown in FIG. 5(a), the login account that is currently used to log into the second client is displayed on the login interface of the first client.

In one implementation, the sending the login verification request to the second client may include: creating a transparent interface of the second client on the login interface of the first client, and sending, on the transparent interface, the login verification request to the second client. In this way, the login verification request can carry the first login signature corresponding to the first client, which is used for login verification.

Details are described with reference to the following examples. As shown by steps S702 to S716 of FIG. 7: A first client 702 obtains a login account that is currently used to log into client 706 from the second client 706, performs an operation (for example, a selected operation) on the login account, responds to an operation instruction generated by the operation and sends a login verification request to a server 708 associated with the second client via the second client 706, and verifies in the server 708 associated with the second client whether the first client is permitted to use the login account to perform the login. When verification is successful, the server 708 associated with the second client sends a response (for example, the response carries a login ticket) of a successful login verification to the first client by using the second client, the first client 702 obtains a login request used for login according to the response, sends the login request to a server 704 associated with the first client, and after displaying a login of the first client 702, obtains returned resource information from the server 704 corresponding to the first client.

In an embodiment provided in this application, on a login interface of a first client running on a terminal, a login account that is currently used to log into a second client running on the terminal is obtained, the second client and the first client having an association relationship; on the login interface of the first client, a login request generated after performing an operation on the login account is obtained, the login request being used for requesting to log in to the first client by using the login account; and the first client is logged in to by using the login account in response to the login request. The first client obtains the login account that is currently used to log into the second client from the second client having the association relationship, and uses the obtained login account to implement a quick login, thereby simplifying login operations for logging in to the client, reducing the number of unnecessary interactions, reducing the login time required for logging into the client, and improving the login efficiency over the existing technology.

As an optional solution, the second obtaining unit 1004 includes:

1) a first receiving module, configured to receive a selection instruction, the selection instruction being used for selecting the login account displayed on the login interface of the first client;

2) a sending module, configured to send a login verification request to the second client in response to the selection instruction, the login verification request at least carrying a first login signature corresponding to the first client;

3) a first obtaining module, configured to obtain a response indicating a successful login verification sent by the second client, the response carrying a login ticket used for logging in to the first client; and 4) a second obtaining module, configured to obtain the login request generated by using the login ticket.

In one implementation, the foregoing first login signature may be, but is not limited to, a signature used for uniquely identifying the first client. By sending the first login signature of the first client that currently requests login, the first login signature and a second login signature that is registered in advance can be compared for verification, thereby ensuring an efficient and quick verification on the quick login process of the first client.

Details are described with reference to the following examples. A selection instruction on a login account (as shown in FIG. 5(a)) that is displayed on a login interface of a first client and that is currently used to log into a second client is received, and a login verification request is sent in response to the selection instruction, and a waiting interface of "logging in" is displayed on a terminal. After obtaining a response indicating a successful login verification sent by the second client, a login request generated by using a login ticket used for logging in to the first client is obtained, and the login request is sent to a server associated with the first client.

For example, in this embodiment, a login verification process of the first client may be, implemented by using executing code or pseudo shown in FIG. 8.

In an embodiment provided in this application, verification is performed on the obtained login account that is currently used to log into the second client, thereby ensuring security of the first client using the login account to perform the login.

As an optional solution, the apparatus further includes:

1) a sending unit, configured to send, before obtaining the login account that is currently used to log into the second client running on the terminal, the registration request to the server corresponding to the second client, the registration request being used for requesting to register a second login signature of the first client on the server;

2) an establishment unit, configured to establish the association relationship between the first client and the second client.

For example, the foregoing association relationship between the first client and the second client may be a predetermined association relationship, for example, an instant messaging application client, and a community space sharing application client corresponding to the instant messaging application client.

For another example, the association relationship between the first client and the second client may alternatively be established in a manner of registering a login signature. That is, before login of the first client, a login signature of the first client is registered in advance in the server associated with the second client for establishment of the association relationship between the first client and the second client.

According to the embodiment provided in this application, by pre-registering a login signature of the first client on the server a the second client, another login signature obtained from the first client requesting the login can be used for verification, thereby implementing a quick verification whether the first client may use the foregoing login account to achieve a quick login.

As an optional solution, the sending module includes:

1) a creation submodule, configured to create a transparent interface of the second client on the login interface of the first client in response to the selection instruction; and 2) a sending submodule, configured to send the login verification request to the second client on the transparent interface of the second client.

Details are described with reference to the following examples. Before a first client (APP-1) obtains a login account (ID) that is currently used to log into a second client (APP-2) running on a terminal, a registration request is sent to a server (S2) associated with the second client (APP-2) to register a login signature (for example, Sign A) of the first client (APP-1).

When performing a login after obtaining the foregoing login account (ID), the first client (APP-1) sends the login verification request carrying a login signature (for example, Sign B) corresponding to the first client to the server (S2) associated with the second client (APP-2), the server (S2) where the second client (APP-2) is located performs verification on the login signature (for example, Sign A) that is registered in advance and the login signature (for example, Sign B) that is obtained from the first client requesting verification, for example, verifying whether the obtained first login signature (for example, Sign A) is consistent with the registered second login signature (for example, Sign B). When verifying that the first login signature (for example, Sign A) is consistent with the registered second login signature (for example, Sign B), the server sends the response indicating a successful login verification by using the second client.

According to the embodiment provided in this application, by verifying the login signature, implementing a quick verification on whether the first client may use the account that is currently used to log into the second client to perform the quick login, thereby reducing the login time of the first client and improving the login efficiency.

As an optional solution, the first obtaining unit includes:

1) a second receiving module, configured to receive a running request for running the first client;

2) a display module, configured to display the login interface of the first client on the terminal in response to the running request; and 3) a communication module, configured to perform communication between the first client and the second client, to obtain the login account that is currently used to log into the second client, and display the login account on the login interface of the first client.

Details are described with reference to the following examples. The running request for running the first client is received; after determining that the terminal has been installed with the first client and the second client having the association relationship with the first client, the login interface of the first client is opened and displayed, and the login account that is currently used to log into the second client is obtained from the second client by using an android binder communication mechanism. After the first client obtains the foregoing login account during communication, displaying the foregoing login account on the login interface of the first client, for example, as shown in FIG. 5(a), a key (button or icon) of "using the account 125253 that the second client logs in to log in".

According to the embodiment provided in this application, communication between the first client and the second client is performed to obtain the login account that is currently used to log into the second client, so that the first client can use the login account to implement a quick login, thereby reducing the login time required for logging in to the client, and improving the login efficiency over in the existing technology.

Embodiment 4

Figure 11:
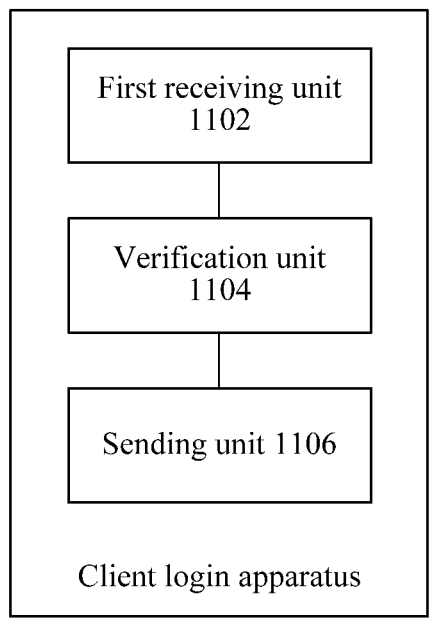
FIG. 11 is a schematic diagram of another exemplary client login apparatus according to an embodiment of the present disclosure.

According to an embodiment of the present disclosure, a client login apparatus configured to implement the foregoing client login methods is further be provided. As shown in FIG. 11, the apparatus includes:

1) a first receiving unit 1102, configured to receive a login verification request of a terminal on which a first client runs for a login account, the login account being a login account that is currently used to log into a second client running on the terminal, and the second client and the first client having an association relationship;

2) a verification unit 1104, configured to verifying, in response to the login verification request, whether the first client uses the login account to perform a login; and 3) a sending unit 1106, configured to send a response indicating a successful login verification by using the second client when verification is successful, so that the first client uses the login account to perform the login.

In one implementation, the foregoing client login apparatus may be applied in, but is not limited to, a login process of clients (for example, an instant messaging application client, and a community space sharing application client corresponding to the instant messaging application client) having an association relationship. That is, during that the first client uses the login account to perform a quick login, the second client having the association relationship with the first client performs quick verification on the login verification request of the login account, verifying whether the first client uses the login account to perform the login, thereby ensuring the first client to implement the quick login, simplifying login operations for logging in to the client, reducing the number of unnecessary interactions, reducing the login time required for logging in to the client login, and improving the login efficiency.

In one implementation, after obtaining the selection instruction to the login account, the first client may, but is not limited to, send the foregoing login verification request to the second client.

That is, as shown in FIG. 6, after obtaining, during login process of a first client running on a terminal 302, a login account that is currently used to log into a second client running on the terminal 302 and having an association relationship with the first client, the first client generates a selection instruction in response to selection operation on the login account, and the terminal 302 sends a login verification request to a server 602 corresponding to the second client in response to the selection instruction, so that the server 602 uses information registered in advance to verify whether the first client on the terminal 302 may use the foregoing login account to perform the quick login. After obtaining, by using the second client, a response indicating a successful login verification sent by the server 602, the first client obtains and generates a login request used for requesting to log in to the first client by using the login account, and sends the login request to the server 306 corresponding to the first client, to obtain resource information of the first client to be displayed after login.

In one implementation, during the foregoing verification of FIG. 6, the server corresponding to the second client 602 may, but is not limited to, perform verification on a login signature. For example, before obtaining the login account that is currently used to log into the second client running on the terminal, the first client sends the registration request to the server corresponding to the second client, the registration request being used for requesting to register a login signature (for example, Sign A) of the first client on the server 602. When performing the login after obtaining the foregoing login account, the first client sends the login verification request carrying a login signature (for example, Sign B) corresponding to the first client to the server 602, the server 602 performs verification (e.g., comparison) on the login signature Sign A that is registered in advance and the Sign B that is obtained from the first client requesting verification, so that it can be quickly verified whether the first client can use the account that is currently used to log into the second client to perform a quick login to the first client, thereby reducing the login time of the first client and improving the login efficiency.

Details are described with reference to the following examples. As shown by steps S702 to S716 of FIG. 7: A first client 702 obtains a login account that is currently used to log into the second client 706 from a second client 706, performs an operation (for example, a selected operation) on the login account, responds to an operation instruction generated by the operation and sends a login verification request to a server 708 associated with the second client by using the second client 706, and verifies in the server 708 associated with the second client whether the first client is permitted to use the login account to perform the login. When verification is successful, the server 708 associated with the second client sends a response (for example, the response carries a login ticket) of a successful login verification to the first client by using the second client, the first client 702 obtains a login request used for login according to the response, sends the login request to a server 704 where the first client is located, and after displaying a login of the first client 702, obtains returned resource information from the server 704 corresponding to the first client.

According to the embodiment provided in this application, verification is performed on the obtained login account that is currently used to log into the second client, thereby ensuring a quick verification on the first client using the login account to login, simplifying login operations for logging in to the client, reducing the number of unnecessary interactions, reducing the login time required for logging in to the client, and improving the login efficiency. Further, security of the first client using the foregoing login account to perform the login can be ensured.

As an optional solution, the login verification request at least carries a first login signature corresponding to the first client, and the apparatus further includes:

1) a second receiving unit, configured to, before receiving a login verification request of a terminal on which a first client runs for a login account, receive a registration request sent by using the second client, the registration request being used for requesting to register a second login signature of the first client; and 2) an establishment unit, configured to establish the association relationship between the first client and the second client.

For example, the foregoing association relationship between the first client and the second client may be a predetermined association relationship, for example, an instant messaging application client, and a community space sharing application client corresponding to the instant messaging application client.

For another example, the association relationship between the first client and the second client may alternatively be established in a manner of registering a login signature. That is, before login of the first client, a login signature of the first client is registered in advance in the server associated with the second client for establishment of the association relationship between the first client and the second client.

According to the embodiment provided in this application, by pre-registering a login signature of the first client on the server associated with the second client, another login signature obtained from the first client requesting the login can be used for verification, thereby implementing a quick verification whether the first client may use the foregoing login account to achieve a quick login.

As another implementation:

1) The verification unit 1104 includes: (1) a verifying module, configured to verify whether the first login signature is consistent with the registered second login signature; and 2) The sending unit 1106 includes: (1) a sending module, configured to send a response indicating a successful login verification by using the second client when the first login signature is consistent with the registered second login signature, the response carrying a login ticket that makes the first client perform a login.

Details are described with reference to the following examples. Before a first client (APP-1) obtains a login account (ID) that is currently used to log into a second client (APP-2) running on a terminal, sending a registration request to a server (S2) associated with the second client (APP-2) and registering a login signature (for example, Sign A) of the first client (APP-1).

When performing a login after obtaining the foregoing login account (ID), the first client (APP-1) sends the login verification request carrying a login signature (for example, Sign B) corresponding to the first client to the server (S2) associated with the second client (APP-2), the server (S2) where the second client (APP-2) is located performs verification on the login signature (for example, Sign A) that is registered in advance and the login signature (for example, Sign B) that is obtained from the first client requesting verification, for example, verifying whether the obtained first login signature (for example, Sign A) is consistent with the registered second login signature (for example, Sign B). When verifying that the first login signature (for example, Sign A) is consistent with the registered second login signature (for example, Sign B), the server sends the response indicating a successful login verification by using the second client.

According to the embodiment provided in this application, by verifying the login signature, implementing a quick verification on whether the first client may use the account that is currently used to log into the second client to perform the quick login, thereby reducing the login time of the first client and improving the login efficiency.

Embodiment 5

Figure 12:
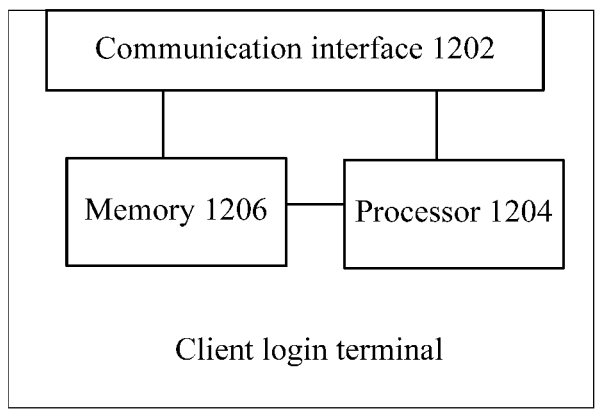
FIG. 12 is a schematic diagram of an exemplary terminal device according to an embodiment of the present disclosure.

According to an embodiment of the present disclosure, a client login terminal configured to implement the foregoing client login methods is further be provided. As shown in FIG. 12, the terminal includes:

1) a communication interface 1202, configured to obtain, on a login interface of a first client running on a terminal, a login account that is currently used to log into a second client running on the terminal, the second client and the first client having an association relationship; configured to obtain, on the login interface of the first client, a login request generated after performing an operation on the login account, the operation performed on the login account being performed on the login interface of the first client, and the login request being used for requesting to log in to the first client by using the login account;

2) a processor 1204, connected to the communication interface 1202, configured to obtain, on the login interface of the first client, the login request generated after performing the operation on the login account, the login request being used for requesting to log in to the first client by using the login account; and 3) a memory 1206, connected to the communication interface 1202 and the processor 1204, configured to store the login account that is currently used to log into the second client, and the second client and the first client having the association relationship.

Optionally, for a specific example in this embodiment, refer to the examples described in Embodiment 1 and Embodiment 2, and details are not described herein again in this embodiment.

Embodiment 6

Figure 13:
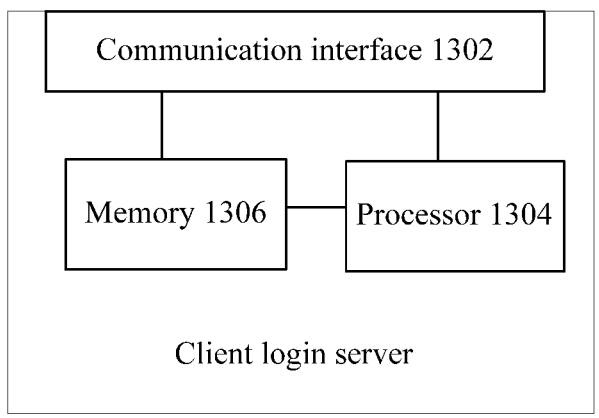
FIG. 13 is a schematic diagram of an exemplary server according to an embodiment of the present disclosure.

According to an embodiment of the present disclosure, a client login server configured to implement the foregoing client login methods is further be provided. As shown in FIG. 13, the server includes:

1) a communication interface 1302, configured to receive a login verification request of a terminal on which a first client runs for a login account, the login account being a login account that is currently used to log into a second client running on the terminal, and the second client and the first client having an association relationship; and configured to send a response indicating a successful login verification by using the second client when verification is successful, so that the first client uses the login account to perform the login;

2) a processor 1304, connected to the communication interface 1302, and configured to verify, in response to the login verification request, whether the first client uses the login account to perform a login; and 3) a memory 1306, connected to the communication interface 1302 and the processor 1304, and configured to store verification information used for login verification.

In one implementation, the foregoing verification information may include, but is not limited to, a login signature of the first client. For example, a first login signature that is carried in a login verification request sent by the first client and that is corresponding to the first client, and a second login signature of a first client, which requests being registered by using the second client.

Optionally, for a specific example in this embodiment, refer to the examples described in Embodiment 1 and Embodiment 2, and details are not described herein again in this embodiment.

Embodiment 7

An embodiment of the present disclosure further provides a storage medium.

In one implementation, the storage medium is configured to store program code used for executing the following steps:

S1: obtaining, on a login interface of a first client running on a terminal, a login account that is currently used to log into a second client running on the terminal, the second client and the first client having an association relationship;

S2: obtaining, on the login interface of the first client, a login request generated after detecting and obtaining an operation performed on the login account, the login request being used for requesting to log in to the first client by using the login account; and S3: logging in to the first client by using the login account in response to the login request.

Optionally, the storage medium is further configured to store program code used for executing the following steps:

S1: receiving a login verification request of a terminal on which a first client runs for a login account, the login account being a login account that is currently used to log into a second client running on the terminal, and the second client and the first client having an association relationship;

S2: verifying, in response to the login verification request, whether the first client uses the login account to perform a login; and S3: sending a response indicating a successful login verification by using the second client when verification is successful, so that the first client uses the login account to perform the login.

In one implementation, the foregoing storage medium may include, but is not limited to: various media that can store program code, such as a USB flash drive, a read-only memory (ROM), a random access memory (RAM), a removable hard disk, a magnetic disk, or an optical disc.

Optionally, for a specific example in this embodiment, refer to the examples described in Embodiment 1 to Embodiment 4, and details are not described herein again in this embodiment.

Embodiment 8

Figure 14:
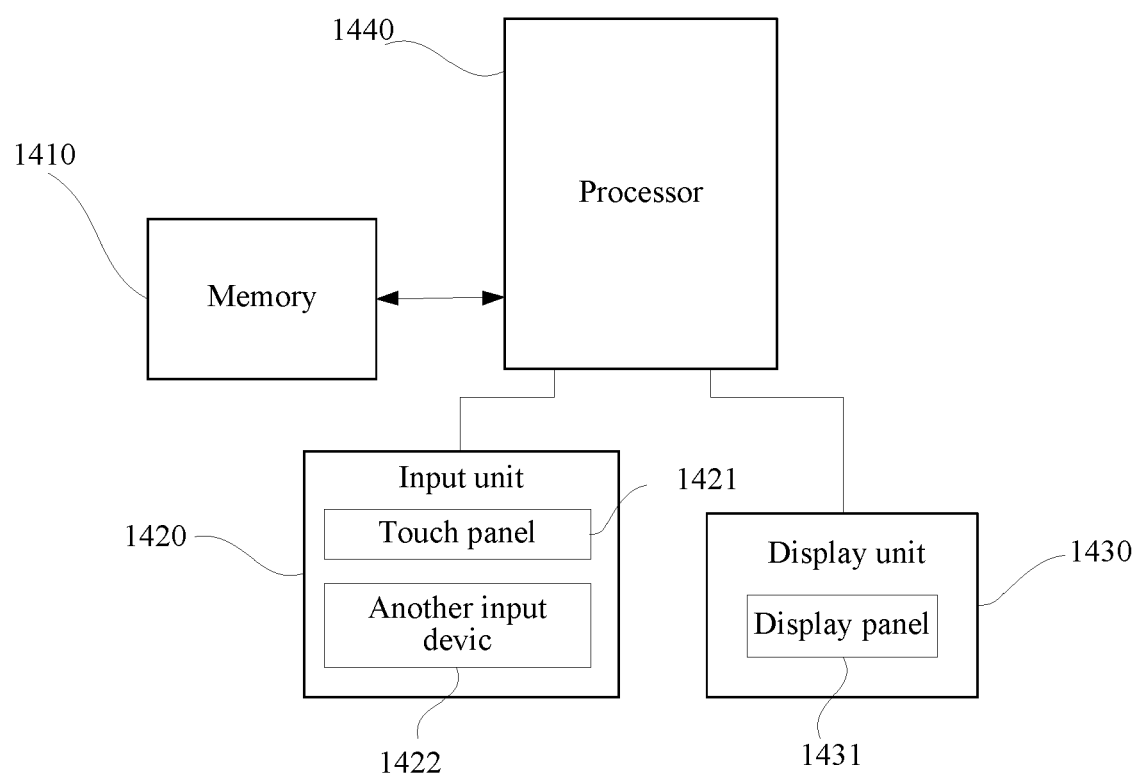
FIG. 14 is a schematic diagram of an exemplary terminal device according to an embodiment of the present disclosure.

An embodiment of this application further provides a terminal configured to implement the foregoing client login methods, as shown in FIG. 14, and for convenience of description, only parts related to the embodiment of this application relevant are shown. For specific technical details that are not disclosed, refer to the method part of the embodiment of this application. The terminal may be any terminal device including a mobile phone, a tablet computer, a Personal Digital Assistant (PDA), a Point of Sales (POS), and an on-board computer, and the terminal device being a mobile phone is used as an example.

FIG. 14 is a block diagram of a structure of a part of a mobile phone related to a terminal according to an embodiment of this application. Referring to FIG. 14, the mobile phone includes components such as a memory 1410, an input unit 1420, a display unit 1430 and a processor 1440. A person skilled in the art may understand that the structure of the mobile phone shown in FIG. 14 does not constitute a limitation to the mobile phone, and the mobile phone may include more components or fewer components than those shown in the figure, or some components may be combined, or a different component deployment may be used.

The following specifically describes the components of the mobile phone with reference to FIG. 14.

The memory 1410 may be configured to store a software program and module. The processor 1440 runs the software program and module stored in the memory 1410, to implement various functional applications and data processing of the mobile phone. For example, the memory 1410 may be configured to store instruction code that is configured to implement the foregoing embodiments, account information, resource information returned from a server, and so on. The memory 1410 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 1410 may include a high speed random access memory, and may also include a non-volatile memory, such as at least one magnetic disk storage device, a flash memory, or another volatile solid-state storage device.

The input unit 1420 may be configured to receive input digit or character information, and generate a keyboard signal input related to the user setting and function control of the mobile phone. For example, a login interface of the client may be performed by using the input unit 1420, for example, selecting a login account to be displayed on the login interface. Specifically, the input unit 1420 may include a touch panel 1421 and another input device 1422. The touch panel 1421 may also be referred to as a touchscreen, and may collect a touch operation of a user on or near the touch panel (such as an operation of a user on or near the touch panel 1421 by using any suitable object or attachment, such as a finger or a touch pen), and drive a corresponding connection apparatus according to a preset program. Optionally, the touch panel 1421 may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch information into touch point coordinates, and sends the touch point coordinates to the processor 1440. Moreover, the touch controller can receive and execute a command sent from the processor 1440. In addition, the touch panel 1421 may be a resistive, capacitive, infrared, or surface sound wave type touch panel. In addition to the touch panel 1421, the input unit 1420 may further include the another input device 1422. Specifically, the another input device 1422 may include, but is not limited to, one or more of a physical keyboard, a function key (for example, a volume control key or a power on/off key), a trackball, a mouse, or a joystick.

The display unit 1430 may be configured to display information input by the user or information provided for the user, and various menus of the mobile phone. For example, the display unit 1430 may be configured to display the login interface of the client and the resource information returned from the server. The display unit 1430 may include a display panel 1431. Optionally, the display panel 1431 may be configured by using a liquid crystal display (LCD), an organic light-emitting diode (OLED), or the like. Further, the touch panel 1421 may cover the display panel 1431. After detecting a touch operation on or near the touch panel 1421, the touch panel 1421 transfers the touch operation to the processor 1440, so as to determine a type of a touch event. Then, the processor 1440 provides corresponding visual output on the display panel 1431 according to the type of the touch event. Although, in FIG. 14, the touch panel 1421 and the display panel 1431 are used as two separate parts to implement input and output functions of the mobile phone, in some embodiments, the touch panel 1421 and the display panel 1431 may be integrated to implement the input and output functions of the mobile phone.

The processor 1440 is the control center of the mobile phone, and is connected to various parts of the mobile phone by using various interfaces and lines. By running or executing the software program and/or module stored in the memory 1410, and invoking data stored in the memory 1410, the processor 1440 performs various functions and data processing of the mobile phone, thereby performing overall monitoring on the mobile phone. Optionally, the processor 1440 may include one or more processing units. Preferably, the processor 1440 may integrate an application processor and a modem processor. The application processor mainly processes an operating system, a user interface, an application program, and the like. The modem processor mainly processes wireless communication. It may be understood that the foregoing modem may also not be integrated into the processor 1440.

In an embodiment of this application, the processor 1440 included in the terminal further controls and performs a method and a procedure performed by the terminal.

The sequence numbers of the preceding embodiments of the present disclosure are merely for description purpose but do not indicate the preference of the embodiments.

When the integrated unit in the foregoing embodiment is implemented in a form of a software functional module and sold or used as an independent product, the integrated unit may be stored in the foregoing computer-readable storage medium. Based on such an understanding, the technical solutions of the present disclosure essentially, or the part contributing to the existing technology, or all or some of the technical solutions may be implemented in a form of a software product. The computer software product is stored in a storage medium and includes several instructions for instructing a computer device (which may be a personal computer, a server, or a network device) to perform all or some of the steps of the methods in the embodiments of the present disclosure.

In the foregoing embodiments of the present disclosure, the description of each embodiment has respective focuses, and for the part that is not detailed in an embodiment, reference may be made to the relevant description of other embodiments.

In the several embodiments provided in this application, it should be understood that the disclosed client may be implemented in other manners. The described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The foregoing descriptions are merely exemplary. It should be noted that a person of ordinary skill in the art may further make improvements or modification without departing from the principle of the present disclosure and the improvements or modification shall fall within the protection scope of the present disclosure.

What is claimed is:

1. A method for logging into an application, comprising:
   obtaining, on a login interface of a first application running on a processor in a terminal device, a login account information that is currently used to log into a second application distinct from the first application and running on the terminal device, via inter-application communication within the terminal device between the first application and the second application, the second application and the first application having an association relationship, wherein the association relationship comprises a pre-registered login signature of the first application in a server associated with the second application;

displaying an icon representing the login account information in the login interface of the first application on the terminal device;

detecting, on the login interface of the first application, an operation performed on the icon;

upon detecting the operation, generating a login request, the login request being used for requesting to log in to the first application by using the login account information associated with the second application; and receiving a confirmation from a server associated with the first application for accessing and logging into the first application.

2. The method according to claim 1, wherein generating the login request upon detecting the operation performed on the icon comprises:

receiving a selection instruction for selecting the login account information represented by the icon on the login interface of the first application;

sending a login verification request by the login interface to the second application in response to detecting the selection instruction, the login verification request at least carrying a first login signature corresponding to an account of the first application;

receiving, by the login interface of the first application, a response indicating a successful login verification sent by the second application, the response further carrying a login ticket used for logging into the first application; and generating the login request using the login ticket.

3. The method according to claim 2, wherein before the obtaining the login account information that is currently used to log into the second application, the method further comprises:

sending a registration request to a server corresponding to the second application, the registration request being used for requesting to register a second login signature of the account of the first application as the pre-registered login signature on the server corresponding to the second application, and the server corresponding to the second application providing service for the second application; and establishing the association relationship between the first application and the second application.

4. The method according to claim 3, wherein after sending a login verification request to the second application in response to detecting the selection instruction, and before receiving a response indicating a successful login verification sent by the second application, the method further comprises:

receiving, by the server corresponding to the second application, the first login signature via the second application;

verifying, by the server corresponding to the second application, whether the received first login signature is consistent with the pre-registered login signature; and upon verifying that the first login signature is consistent with the pre-registered login signature, sending, by the server corresponding to the second application, the response indicating a successful login verification by using the second application.

5. The method according to claim 2, wherein sending the login verification request to the second application in response to detecting the selection instruction comprises:

creating a transparent interface of the second application on the login interface of the first application in response to detecting the selection instruction; and sending the login verification request to the second application via the transparent interface of the second application on the login interface of the first application.

6. The method according to claim 1, wherein obtaining, on the login interface of the first application, the login account information that is currently used to log into the second application comprises:

receiving a running request for running the first application;

displaying the login interface of the first application on the terminal device in response to the running request; and performing communication between the first application and the second application to obtain the login account information that is currently used to log into the second application.

7. A terminal device, comprising:

a memory storing a set of instructions;

at least one processor in communication with the memory, the at least one processor, when executing the set of instructions, is configured to:

obtain, on a login interface of a first application running on the terminal device, a login account information that is currently used to log into a second application distinct from the first application and running on the terminal device, via inter-application communication within the terminal device between the first application and the second application, the second application and the first application having an association relationship, wherein the association relationship comprises a pre-registered login signature of the first application in a server associated with the second application;

display an icon representing the login account information in the login interface of the first application on the terminal device;

detect an operation performed on the icon;

upon detecting the operation, generate a login request and the login request being used for requesting to log in to the first application by using the login account information associated with the second application; and receive a confirmation from a server associated with the first application for accessing and logging into the first application.

8. The terminal device according to claim 7, wherein the at least one processor, when executing the set of instructions to generate the login request, is configured to:

receive a selection instruction for selecting the login account information represented by the icon on the login interface of the first application;

send a login verification request to the second application in response to detecting the selection instruction, the login verification request at least carrying a first login signature corresponding to an account of the first application;

receive a response indicating a successful login verification sent by the second application, the response further carrying a login ticket used for logging into the first application; and generate the login request using the login ticket.

9. The terminal device according to claim 8, wherein before obtaining the login account information that is currently used to log into the second application, the at least one processor, when executing the set of instructions, is further configured to:

send a registration request to a server corresponding to the second application, the registration request being used for requesting to register a second login signature of the account of the first application as the pre-registered login signature on the server corresponding to the second application, and the server corresponding to the second application providing service for the second application; and establish the association relationship between the first application and the second application.

10. The terminal device according to claim 8, wherein the at least one processor, when executing the set of instructions to send the login verification request, is configured to:

create a transparent interface of the second application on the login interface of the first application in response to detecting the selection instruction; and send the login verification request to the second application via the transparent interface of the second application on the login interface of the first application.

11. The terminal device according to claim 7, wherein the at least one processor, when executing the set of instructions to obtain the login account information, is configured to:

receive a running request for running the first application;

display the login interface of the first application on the terminal device in response to the running request; and perform communication between the first application and the second application to obtain the login account information that is currently used to log into the second application.

12. A non-transitory storage medium, configured to store one or more computer programs, the one or more computer programs comprising instructions executable by one or more processors, and the instructions, when executed by a computer, causing the computer to perform:

obtaining, on a login interface of a first application running on a terminal device, a login account information that is currently used to log into a second application distinct from the first application and running on the terminal device, via inter-application communication within the terminal device between the first application and the second application, the second application and the first application having an association relationship, wherein the association relationship comprises a pre-registered login signature of the first application in a server associated with the second application;

displaying an icon representing the login account information in the login interface of the first application on the terminal device;

detecting, on the login interface of the first application, an operation performed on the icon;

upon detecting the operation, generating a login request, the login request being used for requesting to log in to the first application by using the login account information associated with the second application; and receiving a confirmation from a server associated with the first application for accessing and logging into the first application.

13. The non-transitory storage medium of claim 12, wherein the instructions, when executed to cause the computer to perform generating the login request upon detecting the operation performed on the icon, cause the computer to perform:

receiving a selection instruction for selecting the login account information represented by the icon on the login interface of the first application;

sending a login verification request by the login interface to the second application in response to detecting the selection instruction, the login verification request at least carrying a first login signature corresponding to an account of the first application;

receiving, by the login interface of the first application, a response indicating a successful login verification sent by the second application, the response further carrying a login ticket used for logging into the first application; and generating the login request using the login ticket.

14. The non-transitory storage medium of claim 13, wherein the instructions, when executed, further cause the computer to perform:

sending a registration request to a server corresponding to the second application, the registration request being used for requesting to register a second login signature of the account of the first application as the pre-registered login signature on the server corresponding to the second application, and the server corresponding to the second application providing service for the second application; and establishing the association relationship between the first application and the second application.

* * * * *